United States Patent

[11] 3,585,617

[72] Inventors Walter Banziger
Utica;
Donald C. Smith, Mohawk, both of, N.Y.
[21] Appl. No. 797,472
[22] Filed Feb. 7, 1969
[45] Patented June 15, 1971
[73] Assignee Mohawk Data Sciences Corporation
Herkimer, N.Y.

[54] READOUT REGISTER
4 Claims, 3 Drawing Figs.

[52] U.S. Cl. .......... 340/174, 330/30
[51] Int. Cl. .......... G11c 7/02, G11c 5/02, G11c 11/06
[50] Field of Search .......... 340/174; 307/208, 269; 330/24, 30

[56] References Cited

UNITED STATES PATENTS

| | | | |
|---|---|---|---|
| 3,305,729 | 2/1967 | Stein .......... | 330/24 |
| 3,426,335 | 2/1969 | Lord et al. .......... | 340/174 |
| 3,466,630 | 9/1969 | Mayne et al. .......... | 340/174 |
| 2,988,732 | 6/1961 | Vinal .......... | 340/174 |
| 3,324,307 | 6/1967 | Mellot et al. .......... | 307/269 X |
| 3,467,838 | 9/1969 | Glazebrook et al. .......... | 307/269 X |

OTHER REFERENCES

Solid State Products, Inc., Applications and Circuit Design Notes, " A Survey of Some Circuit Applications of the Silicon Controlled Switch And Silicon Controlled Rectifier" Bulletin D420-02-8-59; Aug. 1959, copy in 307— 305, pages 1— 7.

*Primary Examiner*—Stanley M. Urynowicz, Jr.
*Attorneys*—Francis J. Thomas, Richard H. Smith, Thomas C. Siekman and Sughrue, Rothwell, Mion, Zinn and MacPeak

ABSTRACT: Data is read out of magnetic cores and stored in a readout register having a plurality of bit storage stages, each stage including a two-transistor latch circuit and a plurality of output transistors connected to the output of the latch. A strobe pulse applies the core data to the latch circuit and at the same time isolates the output transistors from the latch to prevent the switching of the former during the strobe period.

INVENTORS
WALTER BANZIGER
DONALD C. SMITH
BY, Richard H. Smith
ATTORNEY

READOUT REGISTER

BACKGROUND OF THE INVENTION

This invention relates to data storage registers and, more particularly, to data storage registers adapted for use in receiving and storing binary data read from magnetic core data storage devices.

In accordance with the well-known techniques for reading data out of magnetic core memory devices, each core is addressed or interrogated by current applied to one or more address lines linking the core. This current is poled in a direction calculated to switch the magnetic state of the core in a predetermined direction to a reference state. A sense winding also linking the core has impressed upon it an induced voltage of a first magnitude if the previous state of the core was opposite to the reference state and has impressed upon it a voltage of lower magnitude if the previous state of the core coincided with the reference state. Thus, the information content represented by the previous magnetic state of the core can be read by means arranged to sense the magnitude of the voltage induced on the sense winding at the time of interrogation.

In virtually all applications of magnetic core memories, the data, upon being read out of the memory, must be temporarily stored in some type of buffer storage register, usually called an input-output register or a readout register, to enable external use of the data. Substantial noise is generated when the outputs from the readout register are used to switch remotely located devices or are employed to switch high current devices, such as indicator lamps. This noise, if coupled back onto the sense windings while the cores are still being interrogated can result in erroneous readout of information from the cores.

Heretofore, resolution of this problem has necessitated various complicated schemes for shielding the sense windings from the noise or has necessitated the use of a pair of readout registers, one for receiving the data from the cores and the other for subsequently receiving the data from the first register to enable the driving of the utilization devices.

OBJECTS AND SUMMARY OF THE INVENTION

It is therefore an object of the present invention to provide an improved readout register for receiving data from magnetic cores and for driving remote or high current utilization circuits without generating noise which can affect the core readout operation.

In accordance with the invention, the strobe signal which is used to time the sampling of the readout voltage on the sense winding is employed to temporarily isolate the readout register outputs from the circuits employed to drive the utilization devices. This inhibits the generation of switching noise until after the critical strobing operation has been completed. Thus, any noise which may be coupled onto the sense windings does not affect the readout operation.

These and other objects, features and advantages will be made apparent by the following detailed description of a preferred embodiment of the invention, the description being supplemented by drawings as follows:

DETAILED DESCRIPTION

Figure 1:
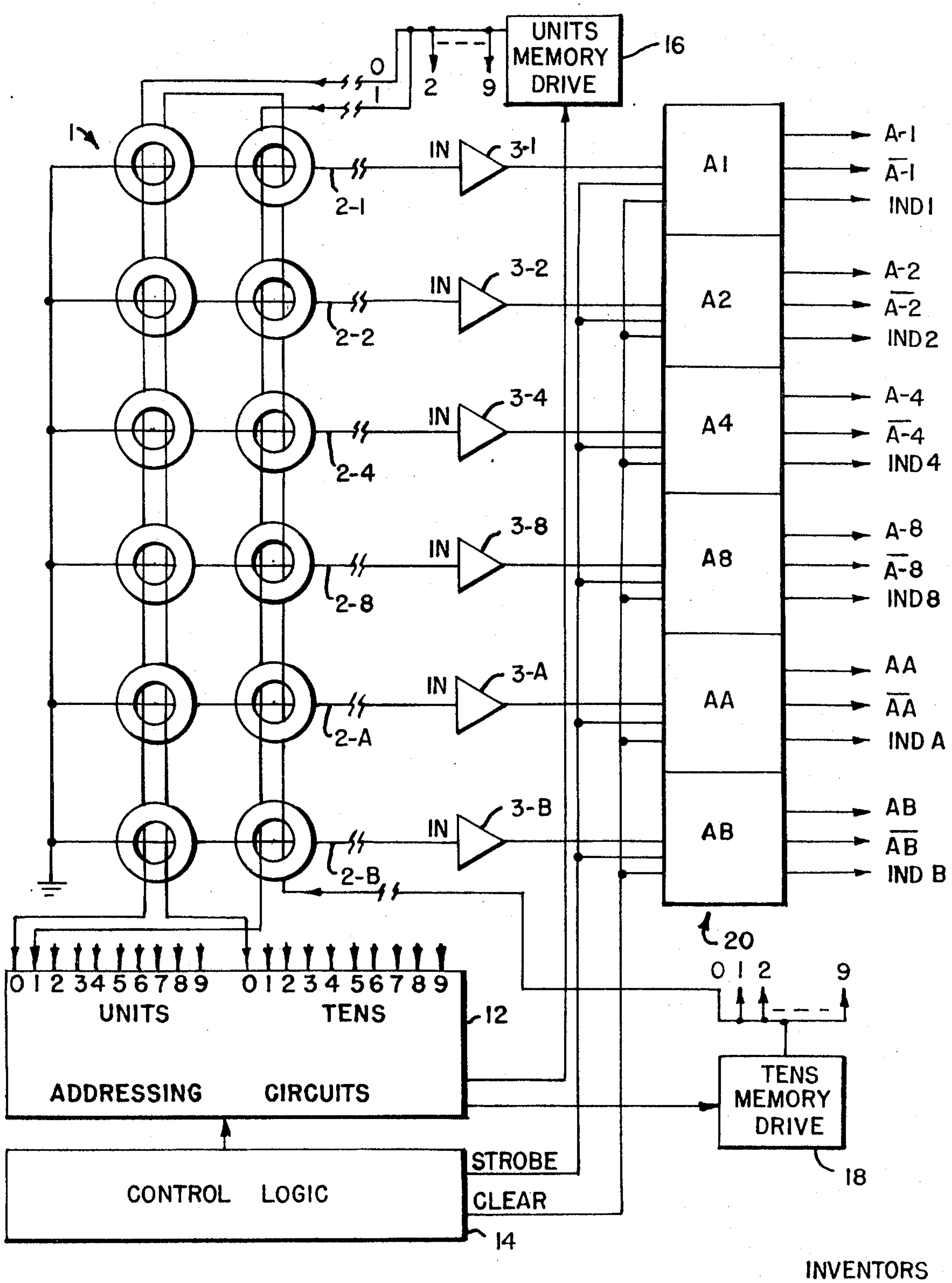
FIG. 1 is a schematic circuit diagram illustrating a section of a magnetic core memory together with the circuits for reading data from the memory into a readout register in accordance with the invention.

FIG. 1 shows a portion of a 100 character magnetic core storage matrix 1. Each character storage location comprises 6 magnetic cores for storing the bits of a 6-bit binary character. The 100 storage locations of the matrix have the identifying addresses of 00 through 99, respectively. Only the first two locations 00 and 01 are shown in FIG. 1.

The 100 storage locations are addressed for readout by the addressing circuits 12 which operate to distribute current pulses from a units memory drive circuit 16 and a tens memory drive circuit 18. The circuit 12 switches the drive pulses onto 20 selection lines consisting of 10 units selection lines 0 through 9 and 10 tens selection lines 0 through 9. In order to read a character out of the storage matrix, the circuit 12 simultaneously closes a selected one of the units line and a selected one of the tens lines. As indicated in FIG. 1, each set of character cores is threaded by one units line and one tens line. The six cores on the left are threaded by the 0 units line and the 0 tens line and thus constitute the 00 character storage location. Thus, to read out the 00 character, the circuits 12 first address the 00 location and then the circuits 16 and 18 concurrently transmit current pulses whereby the 00 location receives a sufficient magnetic field to switch it to a predetermined reference state of residual magnetism. The coincident readout pulses are initiated at different times to minimize switching noise.

For the purpose of this description, the six bits of each data character are identified at the 1-bit, 2-bit, 4-bit, 8-bit, A bit and B bit, respectively. A sense winding 2–1 links the 1 bit cores of all 100 character locations and, similarly, sense windings 2–2, 2–4, 2–8, 2–A and 2–B link all the 2, 4, 8, A and B bit cores respectively. Thus, when the 00 character location is read out, a set of signals is induced on the six sense windings in accordance with the character stored in location 00.

To read out location 01, selection currents are applied in the above described manner to the 1 units address line and the 0 tens address line. Each of the first ten storage locations are linked by the 0 tens address line and by a different one of the units address lines. The 0 units address line links the storage locations 00, 10, 20, 30, etc., while the 1 unit address line links the storage locations 01, 11, 21, 31, etc. Thus, the pattern required for reading out all 100 character locations in ascending sequence consists of applying current to the 0 tens line while sequentially pulsing the 0 through 9 units lines and thereafter applying current to the 1 tens line and again sequentially pulsing the 0 through 9 units lines. This sequence is continued, of course, until the 99 location has been accessed.

Each sense winding feeds one of six sense noninverting amplifiers 3–1, 3–2, 3–4, 3–8, 3–A and 3–B, respectively. The readout signals IN are amplified and conditioned by the amplifiers and presented to the inputs of the different stages A1 through AB of the readout register 20. At a predetermined time during the interrogation operation, the outputs of the six amplifiers are simultaneously sampled under control of a STROBE pulse generated by logic control circuits 14 and the various register stages are set during the strobe period in accordance with the binary data represented at the outputs of the amplifiers. In the preferred embodiment illustrated, each stage of the readout register provides a pair of logic output signals A and $\bar{A}$ indicative of the data stored in the stage and in addition provides an output signal IND which is used to drive an indicating device such as a lamp. As will hereinafter be made clear in the detailed description of the register circuits, these output signals are not switched to an informationally significant state until the strobe period has ended so that the noise effects generated upon such switching are not coupled onto the sense windings to cause erroneous readout. As further indicated in FIG. 1, control logic circuits 14 operate to control the addressing circuits 12 and the drive circuits 16 and 18 in accordance with whatever memory addressing pattern is desired and also generate a CLEAR output signal that is applied to all stages of the readout register 20 at either the beginning or the end of the readout cycle to reset each stage to the "zero" state.

Figure 2:
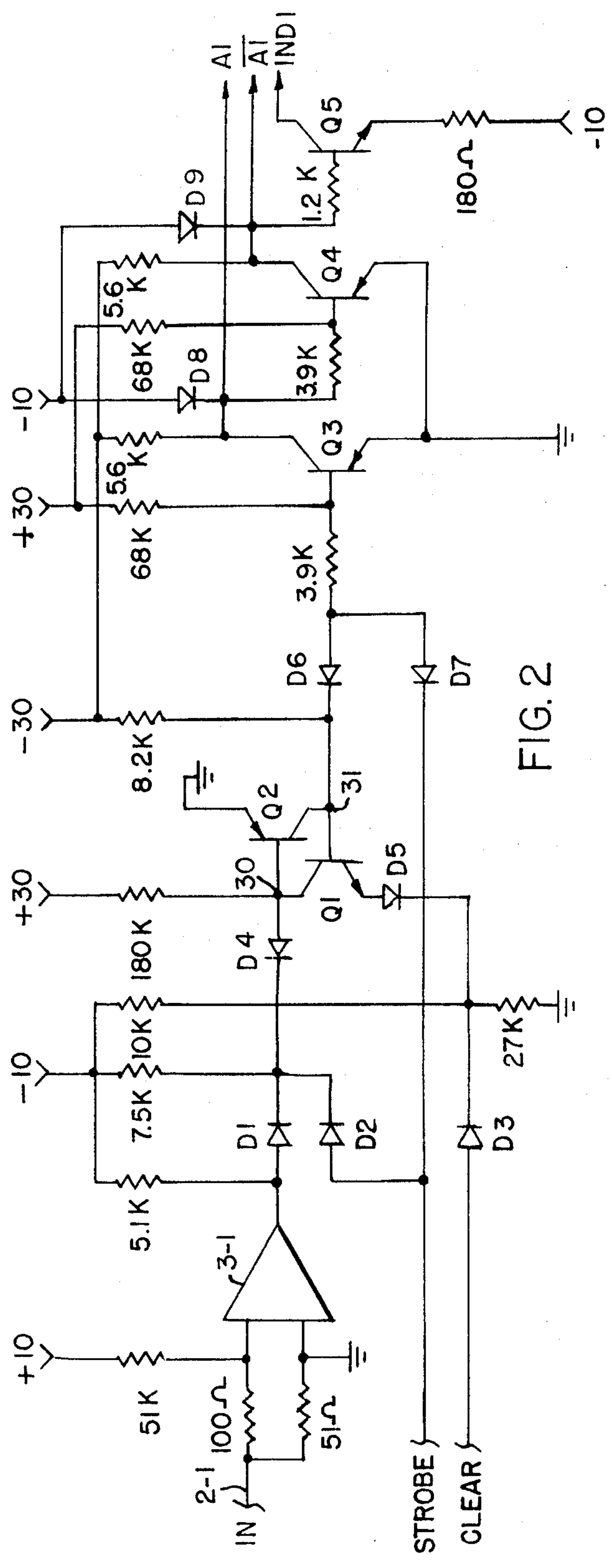
FIG. 2 is a detailed circuit schematic showing one binary bit storage position of a preferred embodiment of the readout register of the invention.

FIG. 2 illustrates in detail the circuits of readout register stage A1. Since the circuits of the other five stages are identical to the A1 circuit, individual descriptions thereof are not herein provided. The register circuit comprises two basic stages, a latch stage including an NPN transistor Q1 and a PNP transistor Q2, and an output stage including transistors Q3, Q4, and Q5. The input to the latch stage is the junction point 30 common to the collector of Q1 and the base of Q2. The input 30 is connected to the output of amplifier 3-1 via a pair of diodes D1 and D4. The output from the latch stage is taken from point 31 common to the collector of Q2 and the base of Q1. Output 31 is coupled to the base of the first output transistor Q3 by a diode D6 and by a 3.9K resistor.

As illustrated in FIG. 2, the strobe signal, which has an amplitude of  10 volts, is applied through a diode D2 to the junction between diodes D1 and D4 and is also applied through a diode D7 to the junction between diode D6 and the 3.9K resistor in the base circuit of Q3.

The output signal A1 is taken from the collector of transistor Q3. That same signal is coupled to the base of transistor Q4 through a 3.9K resistor and controls the conduction state of Q4 in a manner complementary to the conductivity of Q3. Thus, the $\overline{A1}$ output signal is taken from the collector of Q4. The latter signal is also used to drive the base of transistor Q5 through a 1.2K resistor and, since Q5 is an NPN transistor in contradistinction to the PNP characteristic of Q4, the conduction state of Q5 follows the state of Q4. The isolated collector output of Q5 supplies the IND 1 signal to the indicator lamp which provides a visual representation of the data content of the A1 stage of the readout register. Output transistors Q3 and Q4 have their emitters both coupled directly to ground while the emitter of Q5 is returned to a −10 volt potential through a 180 ohm resistor.

The CLEAR signal is fed through a diode D3 to the emitter circuit of transistor Q1. As shown, the emitter of Q1 is connected to a 10K-27K voltage divider through a diode D5. The emitter of Q2 is coupled directly to ground.

OPERATION

With reference now to FIG. 2 and to the waveform diagram of FIG. 3 the operation of the readout register of the invention is hereinafter described. In the initial or reset (zero) state of the register both Q1 and Q2 are nonconducting, Q3 is conducting and Q4 and Q5 are nonconducting. This state is achieved by the application of a positive-going CLEAR pulse which reverse biases diode D5 and turns Q1 off (assuming it had been conducting. At this time the cathodes of D1, D2 and D4 are more positive than ground. The potential at point 30 thus rises to approximately +5 volts whereupon Q2 is also turned off. The potential at output 31 drops toward −30 volts and thus applies a negative-going transition to the base of Q3, turning Q3 on. The collector of Q3 thus rises toward ground potential and this positive-going transition is fed to the base of Q4, turning the transistor off. The collector of Q4 drops toward −30 volts, turning transistor Q5 off. Thus, in the reset condition A1 is high, $\overline{A1}$ is low and the indicator lamp circuit is open. This set of outputs indicates the storage in the register stage of no information or a data bit of zero.

Figure 3:
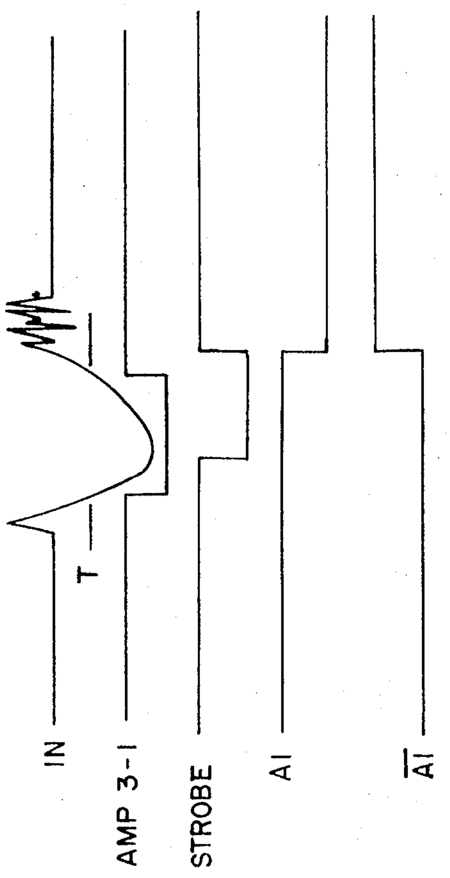
FIG. 3 is waveform diagram illustrating the operation of the readout register.

When a core is accessed for readout (assuming the core is set to represent a one bit), the resultant reversal of the magnetic state of the core causes the IN line to present a negative pulse, as shown in FIG. 3, to the input of sense amplifier 3-1. This results in a negative swing (from approximately +5 volts to −10 volts) at the output of the noninverting amplifier when IN reaches a predetermined level T (FIG. 3). Diode D1 becomes reverse biased. At a time calculated to include the time when the output of the amplifier reaches its negative peak, the −10 volt strobe pulse is applied to the anode of diode D2 and that diode also becomes reverse biased. With both D1 and D2 reverse biased the voltage at input 30 drops toward −10 volts. This forward biases the base-emitter junction of Q2 and Q2 switches into conduction whereby output 31 rises substantially to ground potential. The presence of ground at the base of Q1 forward biases the base-emitter junction of that transistor and it also switches into conduction. With Q1 conducting junction 30 is held at a negative voltage level whereby Q2 becomes latched in the on condition regardless of subsequent voltage changes at the output of the sense amplifier.

As soon as the latch output 31 rises to ground there would be a corresponding positive-going signal transferred to the base of Q3 except that so long as the negative STROBE pulse is present the base of Q3 is clamped to the negative level thereof through the 3.9K resistor and the diode D7. Thus, when the latch output 31 rises to ground indicating the storage of the one bit, diode D6 reverse biases and no effect is had on the output transistors Q3, Q4 and Q5. However, as soon as the STROBE pulse is removed and the strobe input returns to its high level, a positive voltage shift is transferred to the base of Q3 and Q3 is thus switched into nonconduction. The collector of Q3 thus shifts toward −30 volts and the A1 output signal goes negative indicating the storage of a one bit. Concomitantly, transistor Q4 is turned on and the $\overline{A1}$ output shifts positive, causing Q5 to turn on whereby the indicator lamp is ignited.

The circuit remains latched in this output state until a positive CLEAR pulse is applied to turn Q1 and Q2 off and to reset the output transistors as described above.

It can be readily seen that since the output signals A1, $\overline{A1}$ and IND 1 are not switched until the STROBE pulse is removed, the substantial noise which is impressed on the IN signal (see FIG. 3) due to the switching of these outputs is delayed to a point in time which does not interfere with the Strobe period and thus does not adversely affect the readout operation.

Of course, if the core was not set to represent a one bit, the swing at the output of amplifier 3-1 would not have been sufficient to switch Q2 on and the register stage would remain in the Zero or reset state.

It will be appreciated that various changes in the form and details of the above described preferred embodiment may be effected by persons of ordinary skill without departing from the true spirit and scope of the invention.

We claim:

1. A circuit for reading a magnetic core in a magnetic core memory, the circuit comprising:
means for interrogating said core;
means, responsive to said interrogating means, for generating a data signal if said core contains a data bit;
means for generating a strobe pulse during operation of said signal-generating means;
a bistable circuit having an input and an output and being settable to a first and resettable to a second state;
means, responsive to said strobe pulse, for applying said data signal to said input of said bistable circuit, said bistable circuit being adapted to be set to its first state in response to said application of said data signal;
an output circuit connected to said output of said bistable circuit and adapted to provide an output signal representative of the state of said bistable circuit for external utilization; and
means for inhibiting said output circuit in response to said strobe pulse.

2. The circuit as recited in claim 1 further comprising means for resetting said bistable circuit to its second state after said core has been read.

3. An information storage circuit, comprising:
a latch circuit having an input and an output;
means for generating a data-representative signal;
strobing means for applying said data-representative signal to said input of said latch circuit, said latch circuit being adapted to be placed in a state of conductively representative of the data represented by said data-representative signal in response to application of said signal;

an output circuit connected to said output of said latch circuit and adapted to provide an output signal representative of the state of conductivity of said latch circuit for external utilization; and means for inhibiting said output circuit during operation of said strobing means.

4. The circuit as recited in claim 3 wherein said latch circuit comprises:

a pair of opposite conductivity type transistors having their respective base and collector terminals mutually interconnected with the collector of one connected to the base of the other and the collector of the other connected to the base of one, one of said base-collector interconnections being the input to said circuit and the other of said base-collector interconnections being the output from said circuit.